(12) United States Patent
Ouh et al.

(10) Patent No.: US 9,726,815 B2
(45) Date of Patent: Aug. 8, 2017

(54) ULTRA-LOW-LOSS OPTICAL FIBER, AND METHOD AND APPARATUS FOR PRODUCING SAME

(71) Applicant: TAIHAN FIBEROPTICS CO., LTD., Ansan-si (KR)

(72) Inventors: Chi-Hwan Ouh, Anyang-si (KR); Sung-Koog Oh, Anyang-si (KR); Na-Eun Kwack, Seoul (KR); Eun-You Hong, Anyang-si (KR); Jong-Gil Park, Siheung-si (KR); Ji-Hun Yun, Ansan-si (KR)

(73) Assignee: TAIHAN FIBEROPTICS CO., LTD., Ansan-si (KR)

( * ) Notice: Subject to any disclaimer, the term of this patent is extended or adjusted under 35 U.S.C. 154(b) by 0 days.

(21) Appl. No.: 15/105,634

(22) PCT Filed: Dec. 26, 2014

(86) PCT No.: PCT/KR2014/012906
§ 371 (c)(1),
(2) Date: Jun. 17, 2016

(87) PCT Pub. No.: WO2015/099489
PCT Pub. Date: Jul. 2, 2015

(65) Prior Publication Data
US 2017/0003444 A1   Jan. 5, 2017

(30) Foreign Application Priority Data

Dec. 27, 2013  (KR) ........................ 10-2013-0164930
Jan. 10, 2014  (WO) ................ PCT/KR2014/000284

(51) Int. Cl.
*G02B 6/02*        (2006.01)
*C03B 37/02*     (2006.01)
(Continued)

(52) U.S. Cl.
CPC ............ *G02B 6/02* (2013.01); *C03B 37/0213* (2013.01); *C03B 37/0253* (2013.01); *G02B 6/03627* (2013.01)

(58) Field of Classification Search
CPC . G02B 6/02; G02B 6/028; G02B 6/10; G02B 6/03627; C03B 37/021; C03B 37/0213; C03B 37/0253
(Continued)

(56) References Cited

U.S. PATENT DOCUMENTS

| 6,715,323 B1 * | 4/2004 | Roba | C03B 37/02718 65/434 |
| 2003/0077057 A1 * | 4/2003 | Kato | G02B 6/02019 385/123 |

FOREIGN PATENT DOCUMENTS

| JP | 10-259036 | 9/1998 |
| JP | 2006-133496 | 5/2006 |

(Continued)

OTHER PUBLICATIONS

International Search Report, PCT, Apr. 29, 2015, Application No. PCT/KR2014/012906.

*Primary Examiner* — Akm Enayet Ullah
*Assistant Examiner* — Michael Mooney
(74) *Attorney, Agent, or Firm* — Lex IP Meister, PLLC.

(57) ABSTRACT

This ultra-low-loss optical fiber comprises a core having a higher relative refractive index difference than silica and a cladding having a lower relative refractive index difference than silica. The relative refractive index difference of the core with respect to the refractive index of silica is 0.0030 to 0.0055, for example, and the relative refractive index difference of the cladding with respect to the refractive index of silica is −0.0020 to −0.0003. The ultra-low-loss optical fiber has the loss characteristic of simultaneously having optical losses of at most 0.324 dB/km at a wavelength of (Continued)

1310 nm, at most 0.320 dB/km at a wavelength of 1383 nm, at most 0.184 dB/km at a wavelength of 1550 nm, and at most 0.20 dB/km at a wavelength of 1625 nm. The ultra-low-loss optical fiber is supercooled when the surface temperature of the optical fiber has a temperature range in a glass transition section during drawing.

6 Claims, 3 Drawing Sheets

(51) Int. Cl.
    *C03B 37/023*     (2006.01)
    *C03B 37/07*     (2006.01)
    *C03B 37/025*     (2006.01)
    *G02B 6/036*     (2006.01)

(58) Field of Classification Search
    USPC .......... 385/123–128; 65/384, 385, 434, 437, 65/443, 471, 478, 481, 496, 498, 512, 65/513
    See application file for complete search history.

(56) References Cited

FOREIGN PATENT DOCUMENTS

| | | |
|---|---|---|
| JP | 4268115 | 2/2009 |
| KR | 10-2001-0101071 | 11/2001 |

* cited by examiner

Fig. 1          Prior Art
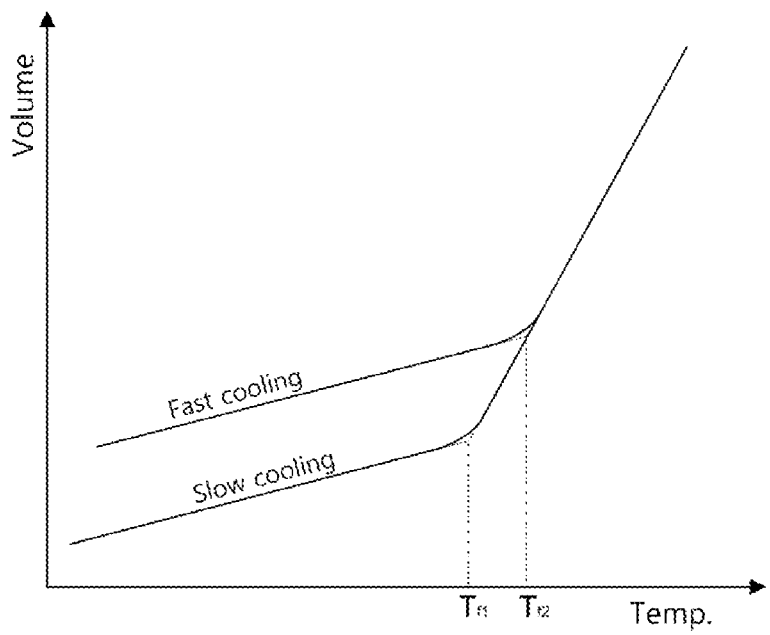
Fig. 2
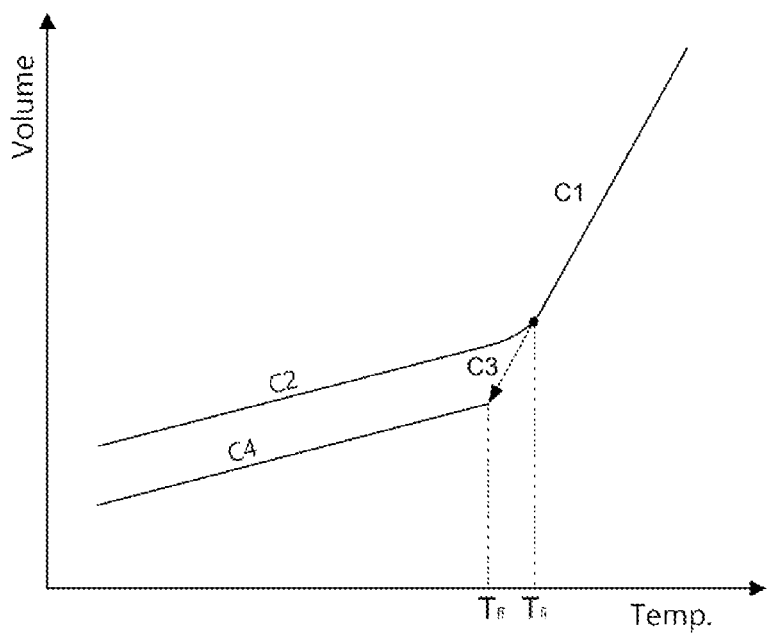

ULTRA-LOW-LOSS OPTICAL FIBER, AND METHOD AND APPARATUS FOR PRODUCING SAME

TECHNICAL FIELD

The present invention relates to an optical fiber having an ultra-low loss, and a method and an apparatus for manufacturing the same, and more particularly to an optical fiber having an ultra-low optical loss and an ultra-low bending loss at a communication use wavelength band of 1260 nm to 1625 nm, and a method and an apparatus for manufacturing the same.

BACKGROUND ART

When an optical fiber having a low optical loss is used in a long-distance optical communication network, a relay distance may be extended, making it possible to significantly lower construction costs of the entire transmission network. The loss of an optical fiber mainly includes Rayleigh scattering caused by density fluctuations in glass, Brillouin scattering generated when optical signals and interior materials cause a minute change in refractive index while being acoustically shaken, Raman scattering generated by input optical signals due to an interaction between the optical signals and molecular vibrations in glass, and an optical loss caused by infrared absorption. Among the factors, Rayleigh scattering is of the greatest importance.

It is now known that when the composition of a core corresponding to an optical signal transmission area is a pure-silica-core fiber (PSCF) corresponding to pure silica glass, a value of an optical loss is substantially not more than 0.15 dB/km. $GeO_2$ is added to $SiO_2$ to increase refractive index in a core of a general communication optical fiber, and as the amount of $GeO_2$ increases, refractive index increases but density fluctuation also increases so that a relatively high scattering loss appears as compared with a pure-silica-core fiber (PSCF).

It is true that the PSCF has a very low optical fiber loss, but there are many restrictions in realizing it. In order that most input optical signals may be transmitted through a core area in the PSCF, there should be a suitable refractive index difference between the core area and a cladding area surrounding the core area. In a single mode optical fiber, the value corresponds to approximately 0.33% to 0.35% of the refractive index of silica glass. The PSCF includes an F-doped cladding layer that may refractive index to adjust a negative refractive index of a large absolute value. When the PSCF has a negative refractive index of a large absolute value, dispersion and a cut-off wavelength value are greatly influenced by a ratio D/d of the diameter D of the cladding to the diameter d of the core. Accordingly, the diameter of the cladding should be sufficiently large, and thus there is a restriction in increasing the size of an optical fiber preform.

Further, there is a restriction in drawing the PSCDF at a high speed because refractive index changes and a Rayleigh scattering loss increases when a drawing tension is applied. Accordingly, the productivity of optical fibers is very low, which increases production costs. In addition, in relation to the curving characteristics of the PSCF, because a change in relative refractive index due to a stress (outer curved surface-tensile stress, inner curved surface-compressive stress) applied as the PSCF is curved is large, there is a limit in maintaining a low refraction loss. Accordingly, in spite of its very low loss value, the PSCF is not widely used in a communication network due to its difficulty in manufacturing, inferior curving characteristics, and high manufacturing costs, and is used only for the special purposes such as a submarine cable. Accordingly, if an optical fiber having a core composition ($SiO_2$—$GeO_2$) widely used in a generic-purpose optical communication network has a low loss and curving characteristics, it may be immediately applied to expansion of an existing communication network and may significantly lower construction costs of a new communication network.

A Rayleigh scattering loss that is the most important of the optical fiber losses is closely relevant to a thermal history that is undergone in an optical fiber drawing process. In particular, it is relevant to a phase transition process that occurs in a cooling process, and the phase transition process has a very close relation to a fictive temperature $T_f$ that is a temperature at which the step is changed to a frozen-in step in which density fluctuations are not present in the presence of fluidity. The relationship between a fictive temperature $T_f$ of glass and a Rayleigh scattering loss is well established through various documents, and it is known that the Rayleigh scattering loss decreases as the fictive temperature $T_f$ of glass decreases. The fictive temperature $T_f$ of glass is relevant to a cooling rate of glass, and as the cooling rate decreases, the fictive temperature $T_f$ of glass decreases.

Accordingly, theoretically, if optical fiber drawing temperature is sufficiently low or optical fiber drawing speed is low, optical fiber cooling speed is low and glass fictive temperature $T_f$ is low so that a Rayleigh scattering loss is so low to obtain an optical fiber of a low loss. However, if the temperature of an optical fiber furnace decreases, an optical fiber drawing tension significantly increases to apply an excessive stress to an optical fiber and cause a change in refractive index, thereby increasing loss. Accordingly, considering the fact, both a low drawing temperature and a low drawing speed are necessary in order to obtain optical fiber characteristics of a very low loss. The operation temperature of a general optical fiber furnace is not less than 2250° C. and the drawing speed of the optical fiber furnace is about 30 m/s. Accordingly, even though an optical fiber of a very low loss may be obtained through a method of drawing an optical fiber at a very low drawing temperature and at a very low drawing speed, productivity deteriorates severely and it is impossible to manufacture an optical fiber of a competitive price.

PRIOR TECHNICAL DOCUMENTS

Patent Documents (Patent document 1) JP2006-133496 A

DISCLOSURE

Technical Problem

An optical fiber should be drawn both at a low drawing temperature and at a low drawing speed to realize an ultra-low loss of the optical fiber in an existing method, and the present invention has been made in an effort to overcome the technical problem of the prior art and provides a method for manufacturing an ultra-low loss optical fiber at a high productivity by effectively lowering a fictive temperature of glass while the optical fiber is drawn at a high speed.

The present invention also provides a method of manufacturing an optical fiber that has a very low loss while having the same composition as that of an existing single mode optical fiber core in which $GeO_2$ is included in a core area instead of a pure-silica-core fiber that is a representative low loss optical fiber.

Technical Solution

In order to solve the above-mentioned problems, the present invention rapidly lowers glass volume (increase density) through additional rapid cooling in a phase transition region (a temperature range before density fluctuation of glass is completely stopped at a temperature of not more than a glass fictive temperature $T_f$ that is a phase transition changing point in an existing optical fiber cooling method) that is a region in which the state of an optical fiber changes in an optical fiber drawing process so that a secondary phase transition changing point $T_{f2}$ is formed at a temperature lower than $T_f$. As a result, because a Rayleigh scattering loss may be reduced by lowering the glass fictive temperature $T_f$, an optical fiber having a very low loss may be obtained without lowering an optical fiber drawing speed.

In accordance with an aspect of the present invention, there is provided a method for manufacturing an ultra-low loss optical fiber, the method including the steps of: (a) drawing a fused optical fiber preform into an optical fiber; (b) supercooling the optical fiber drawn in the step (a) while maintaining a surface temperature of the optical fiber within a temperature range in a glass transition section; and (c) additionally cooling the optical fiber supercooled in the step (b).

In accordance with another aspect of the present invention, there is provided an apparatus for performing the method of claim 1, the method including: a furnace that fuses an optical fiber preform and draws the fused optical fiber preform into an optical fiber; a supercooling unit that supercools the optical fiber fused and drawn by the furnace while maintaining a surface temperature of the optical fiber within a temperature range in a glass transition section; and a cooler that additionally cools the optical fiber cooled by the supercooling unit.

In accordance with another aspect of the present invention, there is provided an ultra-low loss optical fiber manufactured through the method of claim 1, the ultra-low loss optical fiber including: a core having a relative refractivity difference of not less than 0.0030 and not more than 0.0055 with respect to silica; and a cladding arranged outside the core and having a low relative refractivity difference with respect to silica.

Advantageous Effects

According to the present invention, an ultra-low loss optical fiber can be obtained by effectively lowering a glass fictive temperature to reduce a Rayleigh scattering loss without lowering drawing temperature and drawing speed while having the same composition as an existing single mode. According to the method, productivity is very excellent as compared with an existing ultra-low loss optical fiber (for example, a PSCF), and a geometric structure of an optical fiber fully coincides with an existing single mode optical fiber so that the optical fiber may be immediately applied to an existing optical fiber communication network and a new communication network and a relay distance may be increased by not less than 10% as compared with an existing technology due to an ultra-low loss effect so that overall network construction costs may be effectively lowered by decreasing use of optical amplifiers.

Further, the ultra-low loss optical fiber according to the present invention has the same size and refractive index as those of an existing optical fiber and has a geometric structure that fully coincides with that of the existing optical fiber so that it may be fully compatible with an existing optical communication network in replacing, expanding, and newly installing a conventionally installed optical communication network.

Further, the optical fiber according to the present invention may contribute to light weight of an optical fiber by reducing the size of an existing optical fiber cable because it has ultra-low loss and low bending loss characteristics. The result reduces production costs of various cables and contributes to reduction of system construction costs, which is beneficial to users.

Further, the ultra-low loss optical fiber according to the present invention may be applied to a submarine cable that requires high reliability and ultra-low loss because the loss is sufficiently low. The ultra-low loss optical fiber may contribute to construction of a new communication network by constructing a system at a remarkably low price as compared with an existing optical fiber (mainly, a PSCF) used in a submarine cable while having the same composition and geometric structure as those of an existing single mode optical fiber.

DESCRIPTION OF THE INVENTION

FIG. 1 is a graph depicting a relationship between a volume of glass and a temperature of the glass in a generally known process of cooling the glass;

FIG. 2 is a view illustrating the concept of a method for manufacturing an optical fiber according to the present invention;

BEST MODE

Hereinafter, exemplary embodiments of the present invention will be described in detail with reference to the accompanying drawings.

FIG. 1 is picture illustrating a change in a volume of glass according to a change in temperature in a process of rapidly cooling glass that has been sufficiently melt at a high temperature. As illustrated, the change rate of the volume rapidly changes at a specific point of inflection (a glass fictive temperature, $T_f$). That is, the volume of the glass rapidly changes as the temperature of the glass decreases at a temperature higher than the glass fictive temperature $T_f$, and the change rate significantly decreases at a temperature lower than the glass fictive temperature $T_f$. In general, because a degree of density fluctuation does not change at a temperature of not more than the glass fictive temperature $T_f$, this state is defined as a frozen-in state.

The glass fictive temperature $T_f$ is closely relevant to the cooling speed of glass, and the glass fictive temperature $T_f$ increases as the cooling speed of the glass becomes higher. In FIG. 1, $T_{f1}$ denotes a glass fictive temperature in the case of slow cooling, and $T_{f2}$ is a glass fictive temperature in the case of fast cooling. The glass transition region is defined as a region between a glass fictive temperature $T_{f,fast}$ of the glass in the case of fast cooling and a glass fictive temperature $T_{f,slow}$ of the glass in the case of slow cooling, and in the region, the volume change rate according to a change in temperature is not strictly linear. It is known that the transition region of silica glass is approximately between 1000° C. and 1300° C.

The present invention rapidly decreases the volume of glass by additionally rapidly cooling the glass in a glass transition region that is a step shortly before the glass structure reaches a completely frozen-in state, thereby shifting the phase of the glass such that the glass follows a volume change rate for the temperature change of a low cooling curve in a cooling curve. Accordingly, an effect that is achieved when slow cooling is performed due to low-speed drawing may be obtained while high-speed drawing is performed. As a result, the glass fictive temperature $T_f$ that is closely relevant to Rayleigh scattering is moved to a temperature $T_{ff}$ that is a temperature lower than the initial glass fictive temperature $T_{fi}$ so that Rayleigh scattering losses may be reduced and thus an ultra-low loss may be achieved. The concept view of a phase shift by supercooling is illustrated in FIG. 2. Although an optical fiber in state C1 illustrated in FIG. 2 is cooled into state C2 according to the related art, an optical fiber in state C2 is cooled into state C4 via state C3 corresponding to a supercooling process performed in a glass transition region.

Figure 3:
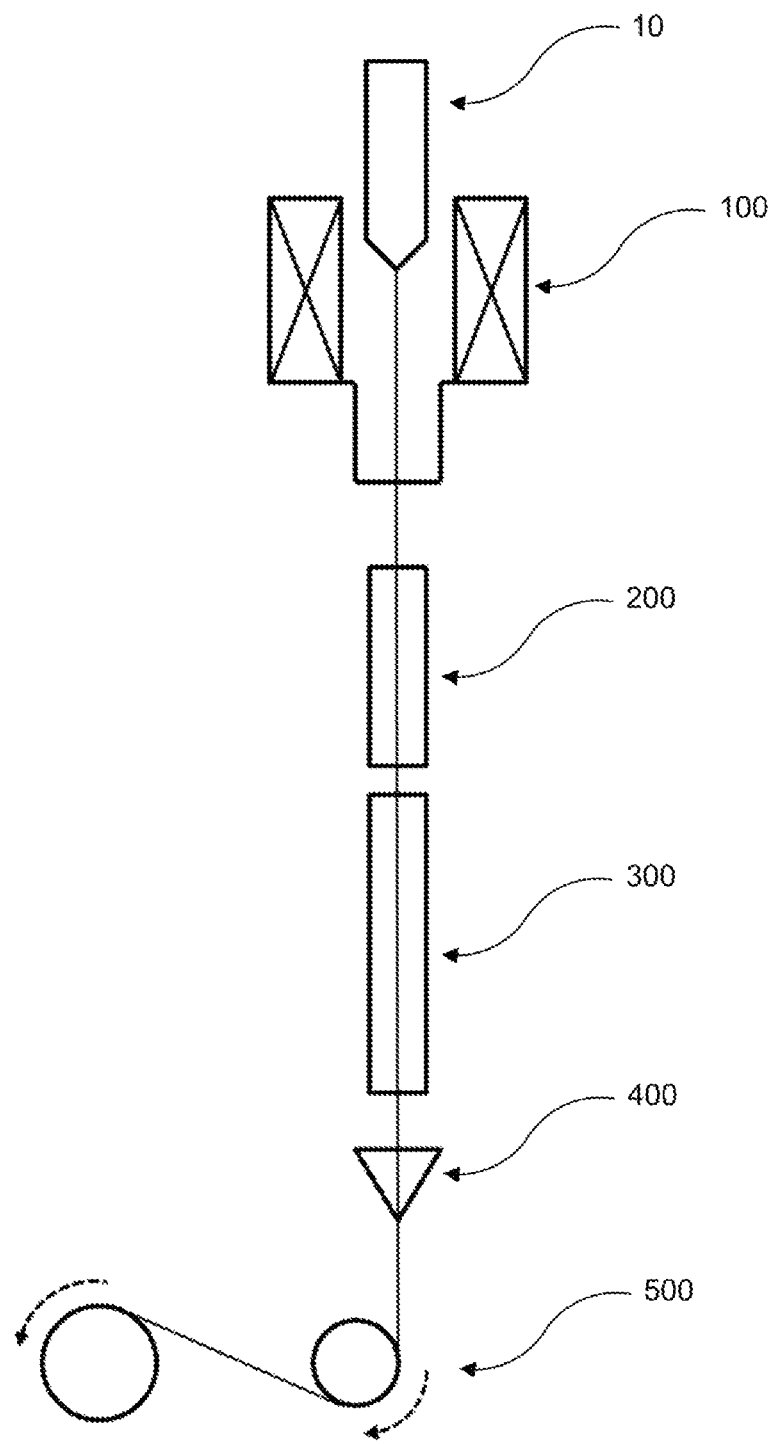
FIG. 3 is a view schematically illustrating an apparatus for manufacturing an optical fiber according to the present invention.

FIG. 3 schematically illustrates an apparatus for manufacturing an optical fiber according to the present invention. The supercooling apparatus 200 for supercooling the drawn optical fiber is situated immediately below an electric furnace 100. A temperature of the optical fiber that enters the supercooling apparatus 200 should be in a temperature range of the glass transition region. In the case of a general silica optical fiber, because the glass transition region is approximately from 1000° C. to 1300° C., the temperature of the optical fiber that enters the supercooling apparatus 200 falls within the temperature range by adjusting the location of the supercooling apparatus 200 according to the drawing speed of the optical fiber and the temperature of the optical fiber discharged from the electric furnace 100. When the temperature of the optical fiber that enters the supercooling apparatus 200 is lower than the temperature corresponding to the glass transition region, a phase shift in a cooling curve does not occur because the optical fiber enters the supercooling apparatus 200 while the glass structure does not have density fluctuation. That is, the glass fictive temperature $T_f$ cannot be lowered.

The temperature of a general optical fiber furnace 100 varies according to the size and the drawing speed of the optical fiber preform 10, but falls within approximately 2000° C. to 2300° C. The optical fiber softened through sufficient dissipation of heat within the electric furnace 100 is extracted to the outside of the electric furnace 100 through driving and tensioning of a capstan 500. The optical fiber drawing tension is determined according to the temperature and the drawing speed of the electric furnace 100, and the value is approximately from 100 g to 200 g. The surface temperature of the optical fiber drawn to the outside of the electric furnace 100 varies according to the temperature of a heater in the electric furnace 100, the type and the flow rate of used gas, the internal structure of the electric furnace, and the drawing speed of the optical fiber. Generally, when the optical fiber of a diameter of 125 μm is drawn, the surface temperature of the optical fiber is 1200° C. to 1400° C.

The optical fiber drawn to the outside of the electric furnace 100 is immediately exposed to air to undergo a rapid cooling process, and enters a coater 400 that coats the outer side of the optical fiber for polymer coating while being sufficiently cooled (generally, not more than 60° C.) via a cooling process, after entering a cooler 300 at a lower end of the electric furnace 100.

While the optical fiber enters an optical fiber cooler—a cooler generally used by the medium of a helium gas—at a lower end of the electric furnace 100, the temperature of the optical fiber changes within a temperature range of the glass transition region. The present invention includes a process of supercooling the optical fiber by using a supercooling apparatus 200 that is a rapid cooling facility in the transition process. Then, the cooling speed of the optical fiber varies according to the drawing speed of the optical fiber, but should be a minimum of not less than 3500° C./s. When the cooling speed of the optical fiber is not sufficiently high, a phase shift by supercooling does not occur so that the glass fictive temperature cannot be lowered, making it impossible to lower the loss of the optical fiber. The supercooling apparatus 200 should be arranged at a location over the glass transition region or within the range, and it is suitable to adjust the location upwards and downwards according to the drawing speed of the optical fiber.

The Rayleigh scattering loss $\alpha_d$ caused by density fluctuation of silica glass has the following relationship with the glass fictive temperature $T_f$.

$$\alpha_d = \frac{8\pi^3}{3\lambda^4} n^8 p^2 k t_f \beta_T \qquad \text{Equation 1}$$

Here, λ denotes a wavelength, n denotes a refractive index, p denotes a photoelastic constant, and $\beta_T$ is an equilibrium isothermal compressibility at a glass fictive temperature $T_f$. As can be seen from the relationship, as refractive index increases (in a general optical fiber, as the amount of $GeO_2$, which is a heterogeneous material, increases in silica glass) and the glass fictive temperature $T_f$ increases, Rayleigh scattering loss increases. Accordingly, in order to obtain a low loss optical fiber, it is necessary to lower a relative refractive index or a glass fictive temperature $T_f$. S. Sakaguchi, S. Todoroki, T. Murata, J. Non-Cryst. solids 220 (1997), page 178 shows through an experimental result that the glass fictive temperature $T_f$ and the Rayleigh scattering loss have a linear relationship and asserts that Rayleigh scattering may be controlled by controlling the glass fictive temperature $T_f$. Further, K. Tsujikawa, K. Tajima, M. Ohashi, J. Lightwave Technology Vol. 15 No. 11 (2000), page 1528 experimentally proves that the glass fictive temperature $T_f$ may be lowered by drawing an optical fiber at a low temperature and a low speed in an evaluation of a silica-based optical fiber and as a result, the Rayleigh scattering loss may be reduced. Furthermore, K. Saito, A. J. Ikushima, T. Ito, 및 A. Ito 의 J. Applied Physics Vol. 81 No. 11 (1997), page 7129 experimentally proves that a structural relaxation of silica glass may be induced by adding a fine amount of alkali or alkaline earth metal to silica glass, making it possible to lower the glass fictive glass $T_f$, and asserts that an ultra-low loss optical fiber may be manufactured by using the result.

In the drawing process, a tensile force is applied to the optical fiber, and the tensile force is a physical quantity that is inversely proportional to drawing temperature and proportional to speed. The tensile force applied to an optical fiber changes the refractive index of the optical fiber, and as the tensile force increases, the refractive index of a core having a glass composition of $SiO_2$—$GeO_2$ and the refractive index of a cladding having a glass composition of SiO₂—F. Further, a rapid volume contraction occurring in the drawing process applies a compressive stress to the optical fiber, which also causes an increase in the relative refractive index with respect to silica of the core. Accordingly, when the relative refractive index of the optical fiber core with respect to silica, relative refractive index increases due to tension and rapid cooling in the drawing process, and as a result, an effect of reducing loss by supercooling is reduced by increasing a Rayleigh scattering loss due to a high refractive index. The present invention limits a suitable relative refractive index of the optical fiber core with respect to silica to a range of 0.0030 to 0.0055 with a positive relative refractive index difference (Δ+).

It is known that the refractive index of a cladding that is a layer immediately over the core that guides an input optical signal is effective to curving characteristics when the cladding has a relative refractive index that is lower than that of silica. However, when the cladding has a very low refractive index, it is difficult for optical characteristics, such as mode field diameter, zero dispersion, and cut-off wavelength, to satisfy all the optical fiber requirements (ITU-T requirements). Accordingly, it is necessary to design a refractive index of a cladding that satisfies curving characteristics while minimizing an influence on the optical characteristics. The present invention limits a relative refractive index with respect to silica of a cladding to a range of −0.0020 to −0.0003 with a negative relative refractive index (Δ−).

In order to minimize an influence of an OH-absorption loss that is a loss of a specific wavelength band by curving characteristics of an optical fiber and a hydroxyl group, a ratio D/d of the diameter D of an optical fiber core and the diameter D of a cladding should exceed a predetermined level, and the present invention limits the radio D/d to not less than 3.0.

Figure 4:
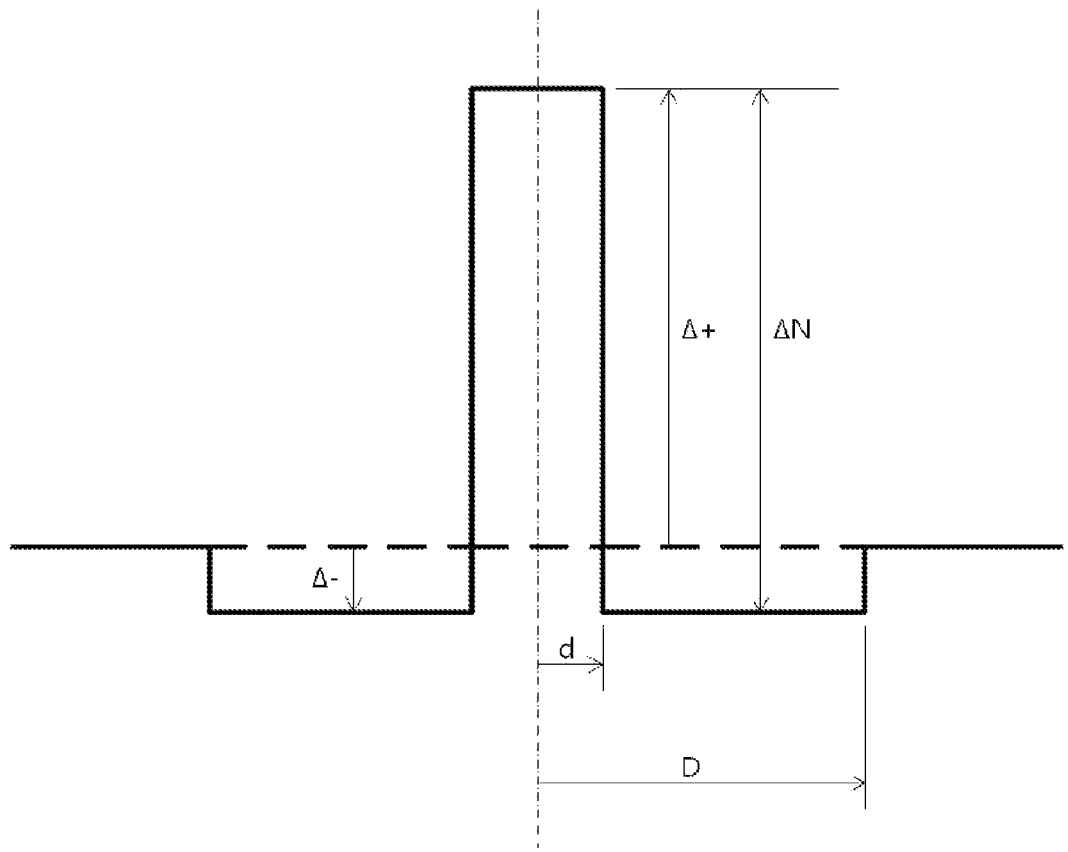
FIG. 4 is a view illustrating a refractive index profile of an optical fiber according to the present invention.

FIG. 4 illustrates the aforementioned profile of a refractive index of an optical fiber according to the present invention.

A result obtained by measuring optical characteristics of an ultra-low loss optical fiber manufactured according to the embodiment of the present invention.

In relation to optical loss characteristics, the optical fiber loss was not more than 0.32 dB/km at a wavelength of 1310 nm, not more than 0.31 dB/km at a wavelength of 1383 nm, not more than 0.18 dB/km at a wavelength of 1550 nm, and not more than 0.20 dB/km at a wavelength of 1625 nm.

In relation to the bending characteristics, when the optical fiber was wound on a diameter of 10 mm once, the bending loss was 0.75 dB at a wavelength of 1550 nm and 1.5 dB at a wavelength of 1625 nm, and when the optical fiber was wound on a diameter of 15 mm ten times, the bending loss was 0.25 dB at a wavelength of 1550 nm and 1.0 dB at a wavelength of 1625 nm.

Further, the zero dispersion was not less than 1300 nm and not more than 1320 nm, the interruption wavelength was not less than 1150 nm and not more than 1330 nm, and the mode field diameter at a wavelength of 1310 nm was not less than 8.8 μm and not more than 9.6 μm.

Further, the ultra-low loss optical fiber manufactured according to the embodiment of the present invention has an MAC value (MFD/cut-off wavelength) that is a ratio of a mode field diameter of 1310 nm to an interruption wavelength, of not more than 7.5.

Table 1 compares an example of the present invention with an existing example.

TABLE 1

| | Wavelength | Example 1 | Example 2 | Example 3 | Example 4 |
|---|---|---|---|---|---|
| Optical characteristics for wavelengths (dB/km) | 1310 nm | 0.327 | 0.319 | 0.319 | 0.313 |
| | 1383 nm | 0.291 | 0.27 | 0.269 | 0.271 |
| | 1550 nm | 0.189 | 0.182 | 0.181 | 0.177 |
| | 1625 nm | 0.203 | 0.192 | 0.193 | 0.19 |
| Zero dispersion (nm) | | 1312 | 1309 | 1308 | 1311 |
| Interruption wavelength (nm) | | 1228 | 1254 | 1255 | 1248 |
| MFD (μm) | | 9.23 | 9.26 | 9.43 | 9.4 |
| Drawing speed (m/s) | | 30 | 30 | 30 | 15 |

Table 1 compares a general condition with a result by the present invention. The optical fiber preforms used in the comparison were manufactured through the same method. In order to compare and verify the effects, the same drawing tower drew optical fibers while only coolers are different. Although four coolers using a helium gas as a process gas was used in an existing drawing condition, a cooler that may perform supercooling according to the present invention was used instead of one helium cooler on the upper side in a condition according to the present invention.

In Table 1, Example 1 represents an optical fiber manufactured by drawing an optical fiber in an existing condition. Examples 2 and 3 illustrate optical fibers manufactured according to the present invention. Examples 2 and 3 apply the same furnace conditions (a temperature, a gas condition, and the like) as those of Example 1, and the drawing speed is 30 m/s. Example 4 corresponds to a result obtained by drawing an optical fiber while lowering the drawing speed to 15 m/s in the apparatus according to the present invention. In the optical characteristics shown in the optical fiber obtained by applying the same process conditions except for the supercooling equipment according to the present invention, Examples 2 and 3 showed remarkably low losses at all wavelength bands as compared with Example 1. As described in relation to FIG. 1, Example 4, in which the drawing speed is lowered, clearly shows that scattering loss decreases as a low glass fictive temperature becomes lower according to slow cooling.

When the optical characteristics of the optical fibers manufactured through the examples are compared, in Examples 2 and 3 in which optical fibers are manufactured according to the present invention, a remarkably low optical loss value is shown at all the wavelength bands used in communication as compared with the existing condition. Further, a result that satisfies all the G657A1 standards was shown in the curving characteristic measurement result. That is, it was identified that the design of a refractive index of an optical fiber according to the present invention was suitable, and the it was identified that the optical fiber manufactured through a supercooling process according to the present invention has a low scattering loss and a low bending sensitivity.

Further, in Example 4, in which an optical fiber is drawn after the drawing temperature and drawing speed thereof is lowered, a result in which the optical characteristic value is additionally lowered. The result shows that the example coincides with an existing theory on the relationship between a glass fictive temperature by an optical fiber cooling curve and a Rayleigh scattering loss.

Although the present invention has been described with reference to the limited embodiments and drawings, the present invention is not limited thereto and it is apparent that the embodiments of the present invention may be variously changed and modified by those skilled in the art without departing from the technical spirit of the present invention and the equivalent scopes of the claims that will be described below.

DESCRIPTION OF REFERENCE NUMERALS

10: preform
100: electric furnace
200: supercooling apparatus
300: cooler
400: coater
500: capstan

The invention claimed is:

1. A method for manufacturing an ultra-low loss optical fiber, the method comprising the steps of:
    (a) drawing a fused optical fiber preform into an optical fiber;
    (b) supercooling the optical fiber drawn in the step (a) while maintaining a surface temperature of the optical fiber within a temperature range in a glass transition section; and
    (c) additionally cooling the optical fiber supercooled in the step (b),
    wherein, between the step (a) and the step (b), the surface temperature of the drawn optical fiber is maintained at a temperature of not less than an upper limit of the temperature range in the glass transition section.

2. The method of claim 1, wherein, in the step (b), the temperate range of the glass transition section is from 1000° C. to 1300° C.

3. The method of claim 2, wherein, in the step (b), the supercooling is performed at a cooling speed of not less than 3500° C./s.

4. An apparatus comprising:
    a furnace that fuses an optical fiber preform and draws the fused optical fiber preform into an optical fiber;
    a supercooling unit that supercools the optical fiber fused and drawn by the furnace while maintaining a surface temperature of the optical fiber within a temperature range in a glass transition section;
    a cooler that additionally cools the optical fiber cooled by the supercooling unit; and
    a unit that moves a location of the supercooling unit such that the surface temperature of the optical fiber introduced into the supercooling unit has a temperature higher than an upper limit of the temperature range of the glass transition section, according to a drawing speed of the optical fiber.

5. An ultra-low loss optical fiber manufactured through the method of claim 1, the ultra-low loss optical fiber comprising:
    a core having a relative refractivity difference of not less than 0.0030 and not more than 0.0055 with respect to silica; and
    a cladding arranged outside the core and having a low relative refractivity difference with respect to silica,
    wherein a relative refractivity difference of the cladding with respect to silica is not less than −0.0020 and not more than −0.0003.

6. An ultra-low loss optical fiber manufactured through the method of claim 1, the ultra-low loss optical fiber comprising:
    a core having a relative refractivity difference of not less than 0.0030 and not more than 0.0055 with respect to silica; and
    a cladding arranged outside the core and having a low relative refractivity difference with respect to silica,
    wherein a ratio (D/d) of a diameter (d) of the core to a diameter (D) of the cladding is not less than 3.0.

* * * * *